Feb. 26, 1963  S. J. BURWELL  3,079,172
COLLAPSIBLE MOTOR SCOOTER

Filed May 4, 1960  3 Sheets-Sheet 1

INVENTOR
Stanley J. Burwell
BY Lawrence J. Winter
ATTORNEY

INVENTOR
Stanley J. Burwell
BY Lawrence J. Winter
ATTORNEY

United States Patent Office 3,079,172
Patented Feb. 26, 1963

3,079,172
COLLAPSIBLE MOTOR SCOOTER
Stanley J. Burwell, 633 Berkeley Ave., Plainfield, N.J.
Filed May 4, 1960, Ser. No. 26,888
12 Claims. (Cl. 280—278)

The present invention relates to a motor vehicle, and more particularly, to a vehicle that can be folded or collapsed when not in use.

An object of the present invention is to provide a novel type motor vehicle or motor scooter that can be completely folded or collapsed into a small compact arrangement when not in use, so that it may be carried by a person in the same manner in which a suitcase or luggage is carried.

Another object of the present invention is to provide a motor vehicle in which the wheels and frame are never dismantled from the chassis when it is desired to fold the vehicle into a compact configuration.

Another object of the present invention is to provide a collapsible motor scooter or power driven bike having a chassis consisting of a conventional rigid compartment similar to a suitcase or luggage in which the complete vehicle is stored when not in use.

Another object of the present invention is to provide a collapsible motor vehicle in which all operating parts form an integral structure and do not have to be dismantled or taken apart when it is desired to fold the vehicle into its compact configuration.

Another object of the present invention is to provide a novel seat means for a completely collapsible motor vehicle.

Another object of the present invention is to provide a main chassis consisting of a substantially rectangular casing similar to a suitcase or luggage carrier which opens and closes in the same manner when it is desired to store the motor vehicle parts therein, so that the vehicle in its compact position cannot be distinguished from a normal suitcase.

Various other objects and advantages of the persent invention will be better understood from the following detailed description when considered in connection with the accompanying drawings forming a part thereof, and in which.

Figure 1:
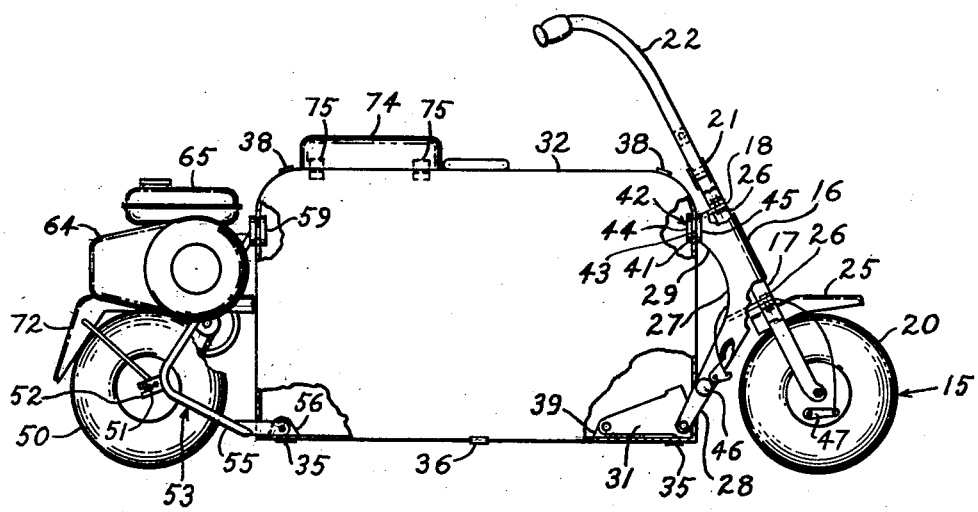
FIG. 1 is a side elevational view of the right side of a motor vehicle embodying the present invention.
Figure 2:
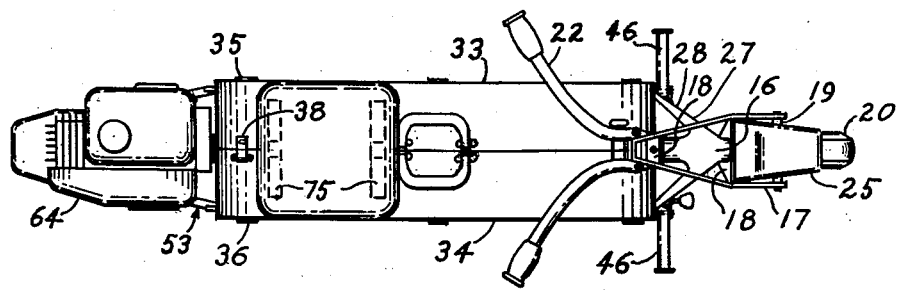
FIG. 2 is a plan view of the motor vehicle shown in FIG. 1.
Figure 6:
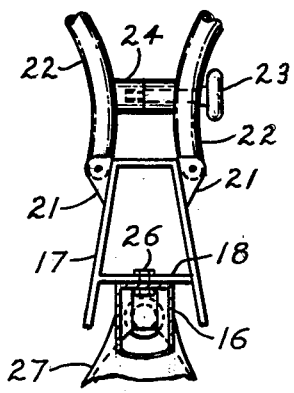
FIG. 6 is a fragmentary view illustrating the means for collapsing the handlebars of the vehicle.

Referring to the drawings, the reference numeral 15 generally designates the foldable motor vehicle of the present invention provided with a tubular steering post or column 16 (see FIG. 1) having a wheel fork or yoke 17 (FIGS. 1, 2) secured thereto by cross braces or struts 18 (FIG. 2). The lower end of fork 17 carries a stationary axle 19 (FIG. 2) upon which is mounted the front wheel 20. The upper end of yoke 17 (FIG. 6) is provided with laterally extending lugs 21 to which are pivotally connected handlebars 22. The handlebars are adapted to be swung downwardly and outwardly against the sides of yoke 17 into the folded position illustrated in FIG. 3. When the handlebars are in their open position as in FIG. 6, they are securely locked in such position by bolt member 23 (FIG. 6) threaded into threaded sleeve member 24 secured to one of the handlebars. A mudguard or fender 25 is secured to the lower end of the fork 17. The tubular steering post 16 and yoke 17 are pivotally connected through conventional pivot means 26 (FIGS. 1 and 6) to an arcuate support frame 27 so that a turning movement of the handlebars will pivot or turn the front wheel with respect to support frame 27. The lower end of frame 27 curves rearwardly and diverges outwardly to form a fork 28 (FIGS. 2 and 10) while the upper portion of frame 27 consists of a single piece member 29 (FIG. 1) that curves rearwardly.

Fork 28 is pivotally connected to a cross bar 30 (FIG. 10) extending through the forward end of a triangular shaped channel member 31 (FIGS. 1, 10 and 11) and is adapted to rotate or turn with respect to this channel member. The channel member is disposed within a substantially rectangular shaped carrying case 32 having the configuration of a conventional rectangular suitcase or luggage case of sufficiently rigid structure to support the weight of a person riding the vehicle.

Figures 12, 13:
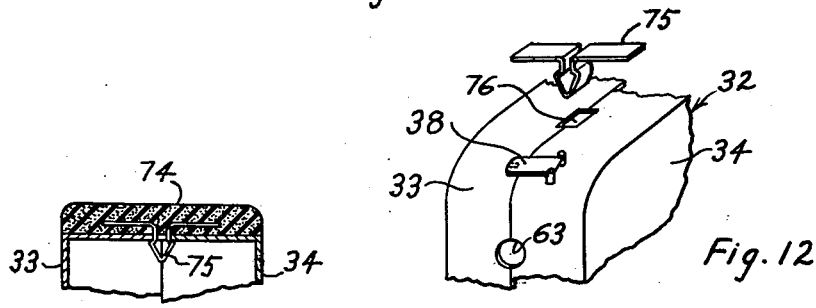
FIG. 12 is a fragmentary view showing the means for securing the operator's seat to the case when the carrying case is closed.
FIG. 13 is a fragmentary rear view of the operator's seat secured to the carrying case.

The carrying case comprises two complementary halves 33 and 34 (see FIG. 4) forming the sides, top, and front and rear end of the case, the two halves being connected along the bottom thereof by hinges 35 and 36 to a flat rectangular base or bottom 37. Conventional suitcase locking latches 38 (FIGS. 4 and 12) are provided for securing each half of the suitcase together.

Figure 11:
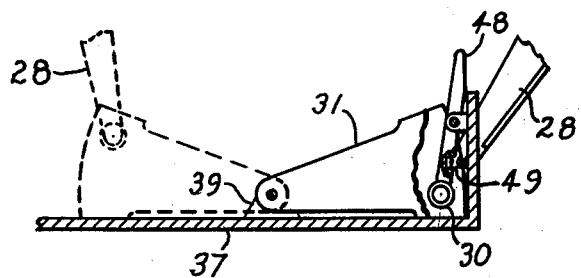
FIG. 11 is a side elevation of the front wheel securing means shown in FIG. 10, illustrating its position when the front wheel is in an operative position, and indicating in dotted lines its position after the front wheel is enclosed in the casing.
Figure 10:
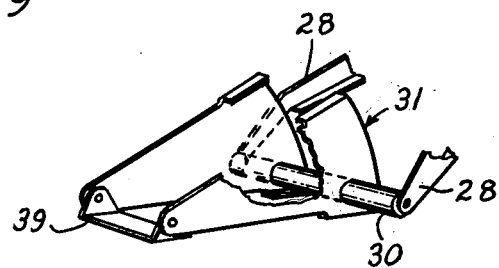
FIG. 10 is a fragmentary view of the means for securing the front wheel assembly to the vehicle carrying case when the vehicle is in the operative position illustrated in FIG. 1.

Channel member 31 has the back end thereof pivotally connected to a U-shaped lug 39 (FIGS. 1, 10 and 11). Lug 39 is secured to the bottom 37 of the carrying case so that the channel member is disposed adjacent the front end of the carrying case when it is turned in a clockwise direction as far as it can go, as indicated in FIG 11, at which time the vehicle is in its road-running or operative position.

Figures 7, 8:
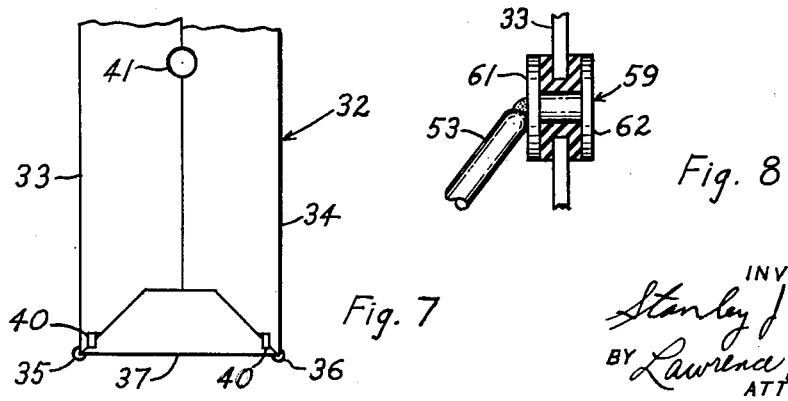
FIG. 7 is a fragmentary front view of the vehicle carrying case when the vehicle is completely enclosed therein.
FIG. 8 is a fragmentary side view of the means for securing the rear wheel of the vehicle in a fixed position when it is in the operative position shown in FIG. 1.

Cut-outs or openings 40 (FIG. 7) are provided in the lower front of the carrying case through which the forks 28 extend when the vehicle is in operation. A circular opening 41 (FIGS. 1 and 7) is provided in the front end of the case intermediate the two halves 33 and 34 of the suitcase to receive a spool member 42 (FIG. 1) secured to the single piece member 29 of the arcuate support frame 27. Spool 42 consists of a reduced cylindrical center portion 43 having enlarged end discs 44 and 45 which preferably have rubber gaskets disposed on the inner sides thereof. When the suitcase is latched into its closed position, the end discs 44 and 45 are disposed on opposite sides of the front of the carrying case, so as to lock the frame 27 in a rigid position. The front end of the channel member 31 is kept from pivoting and in a fixed position abutting bottom 37 by a pivoted locking lever 48 (FIG. 11) fixed to the lower front of the carrying case and a biasing spring 49 (FIG. 11) secured to the front which forces the lever against cross bar 30.

The lower end of the frame is provided with foot rests or pedals 46 (FIGS. 1 and 2) pivotally connected to forks 28 to permit them to be folded in an upward direction against the forks when it is desired to enclose the vehicle within its carrying case. A conventional braking system, generally designated 47 and not forming part of the invention, is also disposed on the fork and front wheel.

Figure 4:
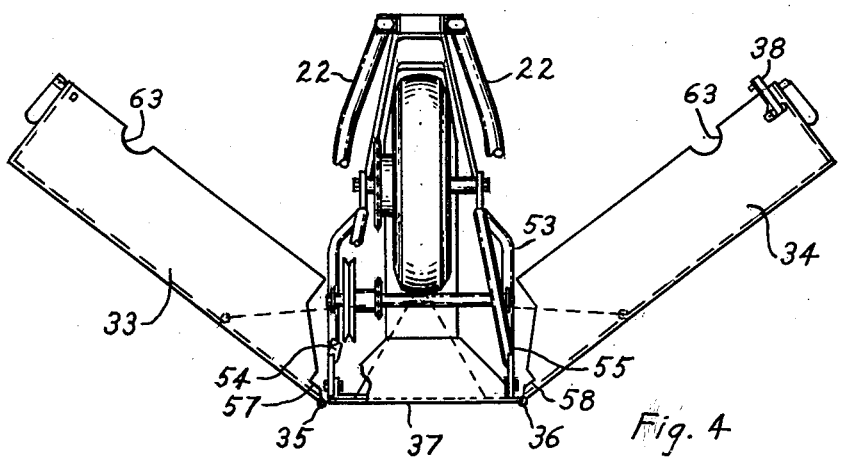
FIG. 4 is a rear view of the vehicle in the collapsed condition shown in FIG. 3, before the hinged portions of the suitcase are locked together.
Figure 5:
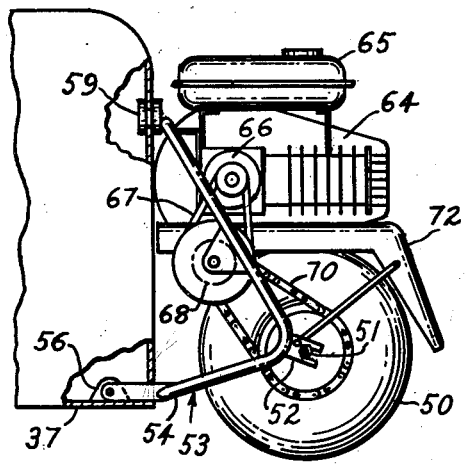
FIG. 5 is a fragmentary view of the rear left side of the vehicle illustrating the conventional power drive means to propel the vehicle.

The rear wheel 50 (FIGS. 1 and 5) is mounted on a stationary axle 51 secured through lug means 52 to a bifurcated tubular frame 53 (FIG. 4) having its lower portions 54 and 55 pivotally connected (FIGS. 4 and 5) to a U-shaped lug 56, similar to lug 39, which in turn is secured to the bottom 37 of the case adjacent the rear end thereof, as best seen in FIG. 5. Openings 57 and 58 (FIG. 4) are provided in the lower rear end of the case to permit the lower leg portions 54 and 55 of the bifurcated frame to extend therethrough when the motor vehicle is in its road-running or operative position.

Figure 9:
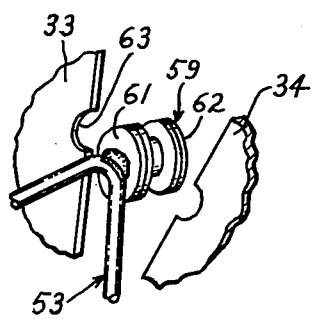
FIG. 9 is a fragmentary perspective view of the securing means of FIG. 8, illustrating the position of the vehicle carrying case just before the rear wheel is secured in the fixed position shown in FIG. 1.

The upper end of the bifurcated frame 53 has a spool 59 (FIG. 9) secured thereto, identical to front spool 42, having a reduced central portion with circular end discs 61 and 62 having rubber gaskets fitted on the inner sides thereof to rigidly secure the bifurcated frame to the rear halves of the case. As best seen in FIG. 9, the case halves 33 and 34 are provided with a circular opening 63 disposed in the upper portion thereof to receive the central portion of spool 59 to lock the rear wheel assembly in rigid position when the vehicle is being used.

The motor vehicle is driven by a conventional gasoline type internal combustion engine 64 (FIGS. 1 and 5) provided with a fuel tank 65. The power is transmitted to the rear wheel through a conventional centrifugal clutch 66, drive pulley 67, and sprocket 68 connected by a drive chain 70 to the wheel. The drive mechanism is mounted on the rear mudguard or fender 72 secured by any conventional means to the bifurcated frame 53. The means for driving the motor vehicle do not form a part of the invention and may be constructed in any well known manner.

A seat cushion 74 (FIGS. 1, 12 and 13) is disposed on the top of the carrying case and is preferably made of molded sponge rubber in which is imbedded two strap steel spring members 75 that are convoluted at the middle to form substantially an arrowhead which will be deformed by squeezing or pressing the members through slotted spaced openings 76 provided intermediate the top of the complementary case halves 33 and 34. Once the arrowhead portion of the members are inserted within the slot member, the pressure on them is released and they will lock the seat cushion to the case. Upon opening of the latches 38 of the suitcase to enlarge openings 76, the seat cushion will immediately be released from the case.

Figure 3:
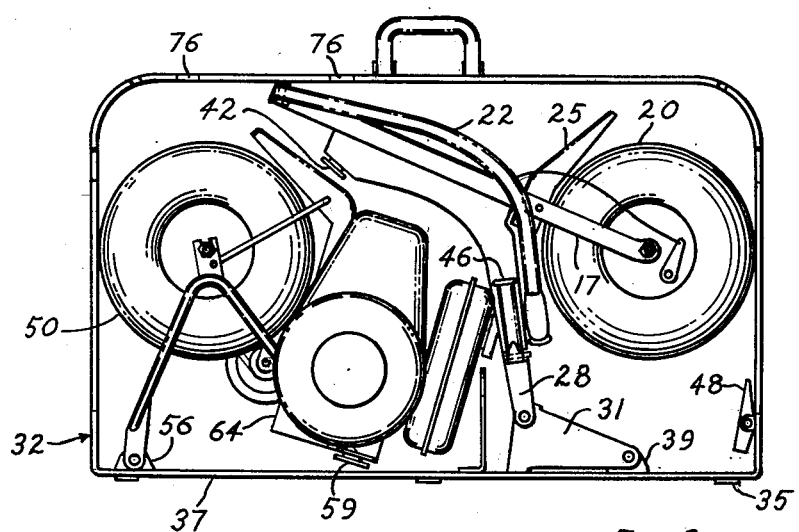
FIG. 3 is a side elevational view of the vehicle in FIG. 1, with parts broken away illustrating the vehicle folded and completely enclosed within its carrying case or suitcase structure.

In operation, when it is desired to fold the vehicle from the operative position in FIG. 1 to that in FIG. 3 in which the entire vehicle is completely enclosed within its carrying case 32, the suitcase latches are unlocked so that the seat cushion is immediately removable from the case. Thereafter, the foot pedals 46 are folded upwardly against the forks 28 and the handlebars 34 are folded downwardly and inwardly by unthreading bolt member 23. Then the suitcase halves 33 and 34 are opened as shown in FIG. 4, so the front and rear frames clear the case and the bottom 37 rests on the ground. The rear wheel and engine assembly 64 are next rotated in a forward or clockwise direction until they are entirely enclosed within the casing as in FIG. 3.

The pivoted lever 48 secured to the front lower end of the suitcase is rotated or moved by hand in a counter-clockwise direction against the force in the biasing spring 49 positioned against its lower end so that the cross bar 30 and channel member 31 may be moved in a clockwise direction to the dotted position in FIG. 11 while arcuate support frame 27 and fork 28, and the front wheel assembly and handlebars carried thereby may also be moved rearwardly in a counter-clockwise direction to the folded position shown in FIG. 3. Thereafter, the halves 33 and 34 are brought together and the latches are then locked so that the vehicle is in its portable or carrying position.

Thus, the present invention provides a portable motor vehicle that may be completely folded within a carrying case similar to a conventional suitcase without the necessity to completely dismantle the operating parts from an integral structure.

Inasmuch as various changes may be made in the form, location and relative arrangement of the several parts without departing from the essential characteristics of the invention, it will be understood that the invention is not to be limited except by the scope of the appended claims.

What is claimed is:

1. A power driven motor vehicle comprising a hollow rectangular carrying case, a front wheel frame pivotally connected to the lower front portion of said case, a rear wheel frame pivotally connected to the lower rear portion of said case, locking means disposed on said frames extending through openings in said carrying case for locking said wheel frames in an operative position, said carrying case being hingedly connected together along the bottom thereof and adapted to be laterally opened along the top thereof, to release said locking means to permit said wheel frame to be folded into said carrying case.

2. A power driven motor vehicle comprising a hollow rectangular carrying case, a front wheel frame, a pair of handle bars for steering the vehicle pivotally connected to said frame for movement in a downwardly and outwardly direction to fold them against said frame, said front wheel frame pivotally connected to the lower front portion of said case, a rear wheel frame pivotally connected to the lower rear portion of said case, locking means disposed on the upper portion of said frames extending through openings in said case for locking said frames in an operative position, said case being hinged along the bottom thereof to be laterally opened along the top thereof to release said locking means to permit said wheel frames to be folded within said case.

3. The vehicle of claim 2 wherein said case is formed from corresponding halves and is hinged along the bottom of its side walls.

4. A power driven motor vehicle comprising a hollow carrying case defined by complementary halves having the configuration of a suitcase with a top and bottom, end walls and side walls, said halves being hingedly connected to said bottom adjacent the lower edges of the side walls to provide lateral opening of the case along its top, said ends having openings therein, front and rear wheel frames extending through said openings and pivotally connected to said bottom, said frames being positioned outside said case when the vehicle is in an operative position, and said front and rear frames being adapted to be folded rearwardly and forwardly, respectively, into said case when it is in an opened position.

5. A power driven motor vehicle comprising a hollow carrying case, a front wheel frame pivotally connected to the lower front end thereof adapted to be folded in a rearward direction therein, a rear wheel frame pivotally connected to the rear end thereof adapted to be folded in a forwardly direction therein, said case having side walls hingedly connected to the bottom of the case for outward displacement from each other to permit said wheel frames to be folded within said case, said frames having locking means disposed on the upper ends thereof, the front and rear ends of said case having openings to receive said locking means to fix said frames in a rigid operative position and having other openings through which said frames extend when the vehicle is in an operative position.

6. A power driven motor vehicle comprising a hollow carrying case, lug means fixed to the lower front portion of said case, a channel member pivotally connected to said lug means swingable from a position forward of said lug means to a position rearwardly thereof, a front wheel frame pivotally connected to said channel member, a rear wheel frame pivotally connected to the lower rear portion of said case, locking means disposed on said frames extending through openings in said carrying case for locking said wheel frames in an operative position, said carrying case being hingedly connected along the bottom thereof and adapted to be laterally opened along the top thereof, to release said locking means to permit said wheel frames to be folded into said carrying case.

7. The vehicle of claim 6 wherein biasing means are operatively connected to said channel member to maintain it forward of said lug means when the vehicle is in an operative position.

8. A power driven motor vehicle comprising a hollow rectangular carrying case, a front wheel frame, said front wheel frame pivotally connected to the lower front portion of said case, a rear wheel frame pivotally connected to the lower rear portion of said case, spool means disposed on the upper portion of said frames extending through openings in said case for locking said frames in an operative position, said case being hinged along the bottom thereof to be laterally opened along the top thereof to release said spool means to permit said wheel frames to be folded within said case.

9. A power driven motor vehicle comprising a hollow rectangular carrying case, a front wheel frame, a pair of handle bars for steering the vehicle pivotally connected to said frame for movement in a downwardly direction to fold them against said frame, said front wheel frame pivotally connected to the lower front portion of said case, a rear wheel frame pivotally connected to the lower rear portion of said case, locking means disposed on the upper portion of said frames extending through openings in said case for locking said frames in an operative position, said case being hinged along the bottom thereof to be laterally opened along the top thereof to release said locking means to permit said wheel frames to be folded within said case.

10. A power driven motor vehicle comprising a hollow carrying case having bottom means, top means, side and end wall means, said side and end wall means being rigidly connected together and hingedly connected to the bottom means for lateral displacement from one another, front and rear wheel frames being positioned outside said case when the vehicle is in an operative position, said front wheel frame pivotally connected to said bottom means and positioned for counterclockwise rotation between said laterally displaced side and end wall means and over and above said bottom means of said case, a rear wheel frame pivotally connected to said bottom means and positioned for clockwise rotation between said laterally displaced side and end wall means and over and above said bottom means.

11. A power driven motor vehicle comprising a hollow carrying case having bottom means, top means, side and end wall means, said side and end wall means being rigidly connected together and hingedly connected to the bottom means for lateral displacement from one another, front and rear wheel frames being positioned outside said case when the vehicle is in an operative position, said front wheel frame pivotally connected to said bottom means and positioned to be moved in a rearward direction between said laterally displaced side and end wall means and over and above said bottom means of said case, a rear wheel frame pivotally connected to said bottom means and positioned to be moved in a forward direction between said laterally displaced side and end wall means and over and above said bottom means.

12. A power driven motor vehicle comprising a hollow carrying case having bottom means, top means, side and end wall means, said side and end wall means being rigidly connected together and hingedly connected to the bottom means for lateral displacement from one another, front and rear wheel frames being positioned outside said case when the vehicle is in an operative position, said front wheel frame pivotally connected to said bottom means and positioned to be moved in a rearward direction between said laterally displaced side and end wall means and over and above said bottom means of said case, a rear wheel frame pivotally connected to said bottom means and positioned to be moved in a forward direction between said laterally displaced side and end wall means and over and above said bottom means, said wheel frames being pivotally connected to said bottom means independently of each other so one wheel frame at a time can be rotated into said case.

References Cited in the file of this patent

UNITED STATES PATENTS

| 369,438 | Myers | Sept. 6, 1887 |
| 2,472,491 | Quinton | June 7, 1949 |
| 2,577,951 | Cortsen | Dec. 11, 1951 |
| 2,839,146 | Bouffort | June 17, 1958 |
| 2,910,130 | Schlaphoff | Oct. 27, 1959 |

FOREIGN PATENTS

| 973,308 | France | Sept. 13, 1950 |
| 974,523 | France | Sept. 27, 1950 |
| 455,583 | Italy | Mar. 2, 1950 |